Dec. 30, 1969  B. E. LONG  3,487,246
ELECTRIC MACHINE
Filed Aug. 28, 1967  2 Sheets-Sheet 1
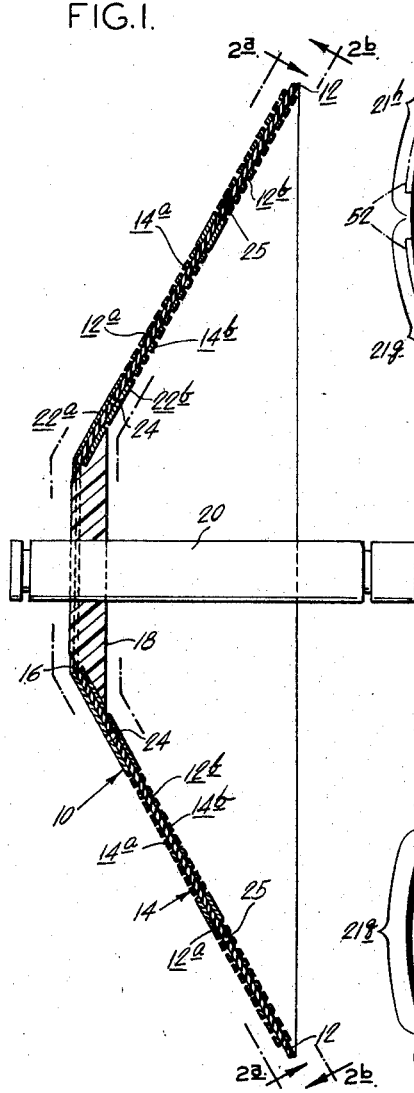
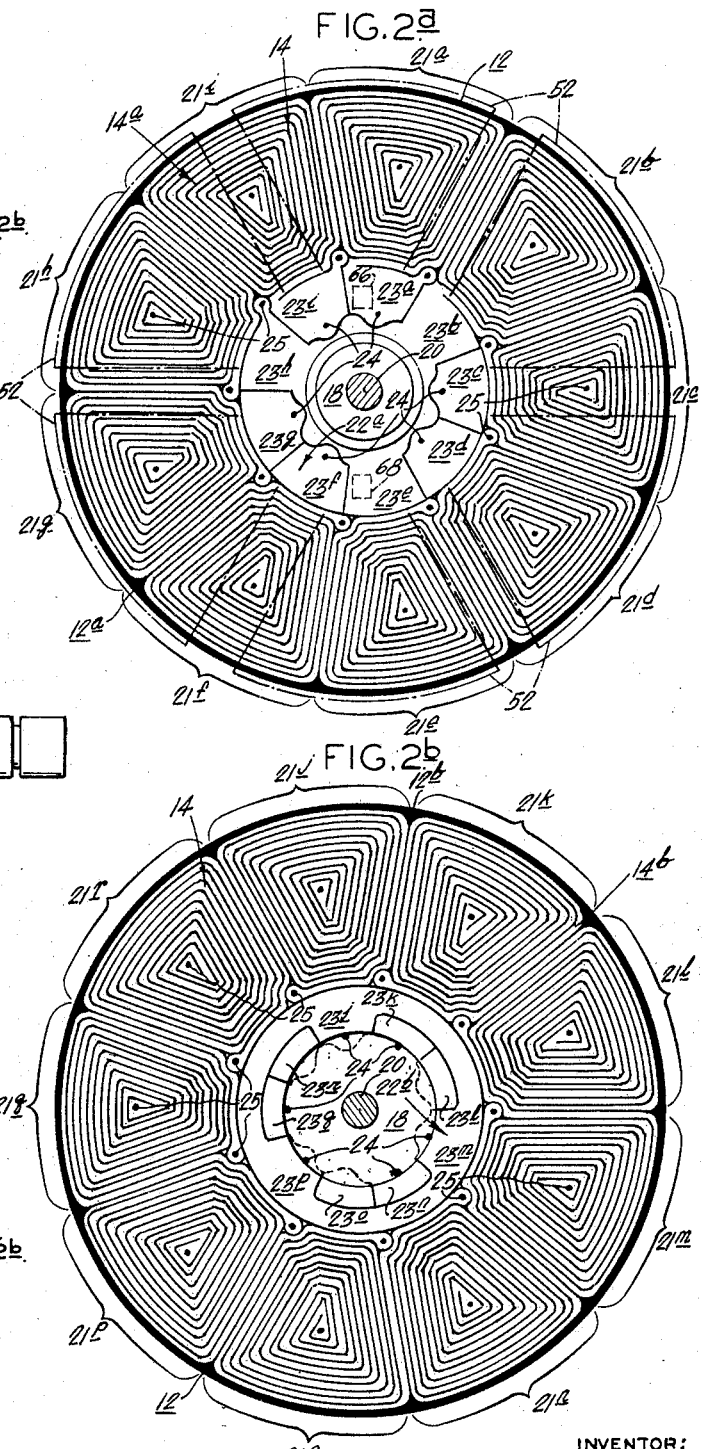
INVENTOR:
BENJAMIN E. LONG
BY
Howson & Howson
ATTYS.

Dec. 30, 1969

B. E. LONG 3,487,246

ELECTRIC MACHINE

Filed Aug. 28, 1967

INVENTOR:
BENJAMIN E. LONG
BY Howson & Howson
ATTYS.

United States Patent Office 3,487,246
Patented Dec. 30, 1969

3,487,246
ELECTRIC MACHINE
Benjamin E. Long, Columbus, Miss., assignor to AMBAC Industries, Incorporated, Columbus, Miss., a corporation of New York
Filed Aug. 28, 1967, Ser. No. 663,630
Int. Cl. H02k 21/26, 1/22
U.S. Cl. 310—154          22 Claims

ABSTRACT OF THE DISCLOSURE

An electric machine having a rotor including a shaft and a stator supporting the shaft, the rotor further including a thin insulating member adapted to rotate with the shaft and formed to provide a conical surface, the insulating member diverging outwardly around the shaft at a selected angle within the range between zero and ninety degrees to the axis of the shaft. A conductive pattern is supported on the conical surface of the insulating member providing one or more windings for the electric machine and includes a plurality of conductors located between the center and circumference of the insulating member. Magnetic means is supported by the stator and generally conforms to the shape of the insulating member for providing magnetic flux paths of alternate polarity across the insulating member through the conductors.

---

The present invention relates to an electric machine, and, more specifically, to a machine employing a rotor having a thin insulating member with a conductive pattern which may be printed, plated, etched, pressure bonded or otherwise fixed thereon.

In recent years there has been a great effort to provide electric machines which are inexpensive and small in size. As a result of these efforts, disc-type rotors have been designed having thin flat armatures with various winding patterns provided thereon. These winding patterns may be etched, plated, printed or pressure bonded on a thin disc armature of insulating material. In electric machines requiring commutator segments, the commutator segments have been located on the thin disc armature and have been interconnected with the conductors of the winding pattern so that conventional brushes can be employed to contact the commutator segments as the armature rotates. In such prior art electric machines the rotor assembly has a shaft journaled in the housing of the machine, and the disc armatures have been arranged concentric with and perpendicular to the support shaft. A plurality of magnets are supported by the housing adjacent the disc armature on one side thereof and a flux return path of magnetic material is supported on the other side of the armature by the housing. The thin disc armature is light in weight for low inertia to facilitate quick starting and stopping.

Difficulties have been experienced with the thin disc-type armatures because of the flexibility of the discs on which the conductors are placed. The thickness of the disc has necessarily been maintained at a minimum in order to reduce losses occasioned by large air gaps in the magnetic flux path. Since the discs are thin, they have been found to warp and drag on or hit the stator field members. This has been a sufficiently serious difficulty to raise doubts about the practicality of such armatures and despite keen interest they have not been commercially made to date. In accordance with the present invention, an improved armature arrangement is provided to eliminate the problems encountered in the prior art.

In accordance with the preferred form of the present invention, an electric machine is provided having a rotor including a shaft and a stator supporting the shaft. An insulating member is adapted to rotate with the shaft and is formed to provide a conical surface diverging outwardly around the shaft at a selected angle within the range between zero and ninety degrees to the axis of the shaft. A conductive pattern is supported on the conical surface of the insulating member providing one or more windings for the electric machine and includes a plurality of conductors located between the center and circumference of the insulating member, the conductive pattern being printed, plated, etched, pressure bonded or otherwise fixed on the insulating member. Magnetic means is supported by the stator and generally conforms to the shape of the insulating member for providing magnetic flux paths of alternate polarity across the insulating member through the conductors.

For applications requiring relatively larger power outputs, at least a second insulating member is employed which is formed to provide a conical surface and conforms to the shape of the first-mentioned insulating member. The second insulating member is also rotatable with the shaft and has a second conductive pattern supported thereon, the second conductive pattern including a plurality of conductors located between the center and circumference of the second insulating member. Means is provided for connecting at least some of the conductors of the first-mentioned conductive pattern with different ones of the conductors of the second conductive pattern.

The armature in accordance with the present invention being conical in form provides a more rigid structure than the flat disc armature of the prior art. The conical configuration overcomes the problem of warping encountered with the prior art armatures. The conical shaped armature of the present invention provides a means whereby more effective conductors may be placed in the active magnetic field, thereby resulting in a more powerful machine for a given diameter. Furthermore, the conical shape of the armature is advantageous in providing a convenient space in and under the armature for reduction gearing which is often required in electric motors, for example. Such gearing can be conveniently mounted in the housing of the machine without increasing the axial length of the machine and thereby keeping the gears protected from foreign elements.

For a better understanding of these and other features and advantages of the present invention, reference is made to the following drawings, in which:

FIG. 1 is a schematic view of a conical shaped armature mounted on a shaft in accordance with the invention and showing a conductive pattern used as windings and commutator segments;

FIG. 2a is a reduced size schematic sectional view taken along line 2a—2a of FIG. 1 and showing one form of a conductive pattern and commutator segments for one side of the armature;

FIG. 2b is a sectional view taken along line 2b—2b of FIG. 1 and showing the associated conductive pattern and commutator segments on the other side of the armature;

Figure 3:
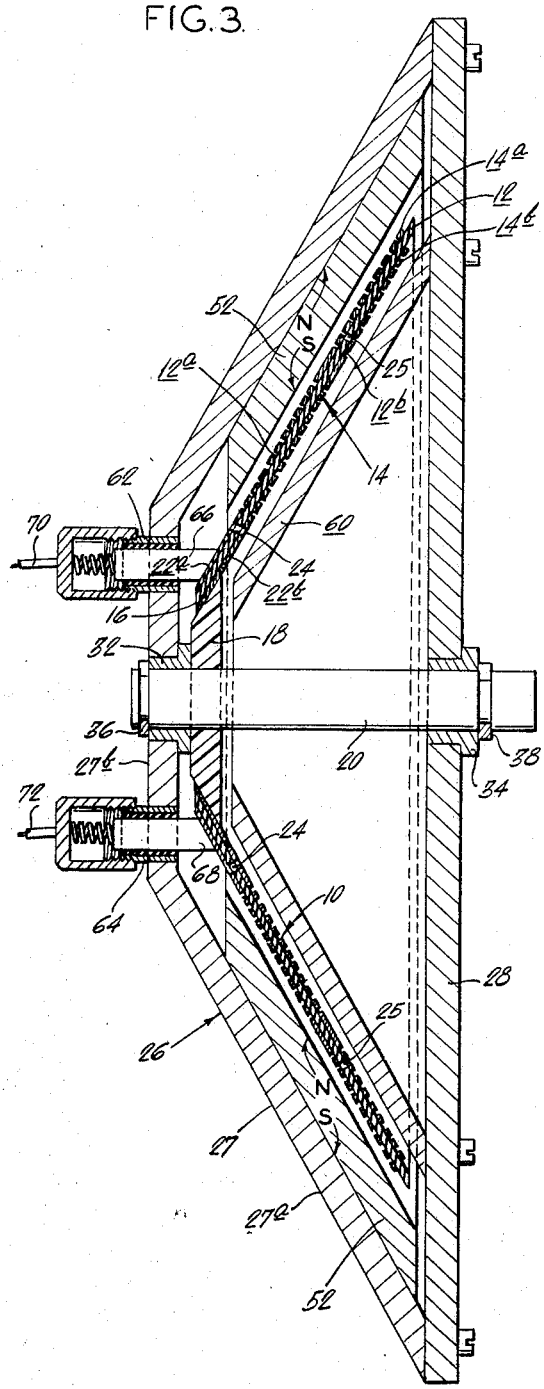
FIG. 3 is a reduced-size schematic sectional view of a D.C. motor utilizing the conical shaped armature of FIG. 1.

Referring to FIGS. 1 and 2, there is shown an armature generally designated 10 which may be used in the rotor assembly of electric machines, such as, D.C. generators and motors and A.C. generators and motors. Although the armature is capable of use in a wide variety of different electric machines, it is shown and described for use in a D.C. motor. Armature 10 comprises a thin insulating member 12 having a winding pattern generally designated 14 of conductive metal such as copper, printed, plated, etched, pressure bonded or otherwise fixed on the insulating member in a conventional manner. The insulating member 12 is preferably made of a resinous material or of fiberglass and is preferably quite thin for more effective utilization of the magnetic fields in the electric machine in which it is employed.

In accordance with the present invention, the insulating member is formed to provide a conical surface, and, more specifically, is frustoconical, the top portion of the cone being omitted to provide a central opening 16 for receiving annular support member 18, which is fixed to insulating member 12, as by an epoxy cement or other permanent bonding agent. Support member 18 may be made of a molded plastic material having a central opening through which a shaft 20 is inserted, the support member being attached to the shaft by any convenient means for rotation therewith. As shown in FIG. 1, annular support member 18 has an outer beveled surface conforming to the slope of the insulating member for easy attachment thereto.

As previously stated, insulating member 12 provides a conical surface and diverges outwardly around the shaft at a selected angle within the range between zero and ninety degrees to the axis of the shaft. In the present instance, the angle that the sides of the insulating member makes to the axis of the shaft is approximately sixty degrees, the axis of the shaft coinciding with the major axis of rotation of the conical surface.

There is shown by way of illustration in FIGS. 2a and 2b, conductive winding patterns 14a and 14b, which may be used on front conical surface 12a and back conical surface 12b, respectively, of insulating member 12 between the center and circumference of the insulating member. The winding patterns 14a and 14b are electrically interconnected in a conventional manner through apertures in the insulating member. Any of the conventional winding patterns may be employed on the insulating member, as desired for any particular application. In the present instance, as shown in FIG. 2a by way of illustration, winding pattern 14a comprises a plurality of nine mutually insulated conductors providing nine arrays 21a, 21b, 21c, 21d, 21e, 21f, 21g, 21h and 21i connected together to form windings for an electric machine. Similarly, in FIG. 2b, there are nine arrays 21j, 21k, 21l, 21m, 21n, 21o, 21p, 21q and 21r of conductors on the opposite side 14b of the insulating member.

For operation of the armature in a D.C. machine, commutator means or segments generally designated 22a and 22b of conductive metal are printed, plated, etched, pressure bonded or otherwise fixed on sides 14a an 14b, respectively, of the insulating member near its central opening 16, as shown in FIGS. 2a and 2b. The number of commutator segments is equal to the number of windings and there is shown nine commutator segments 23a, 23b, 23c, 23d, 23e, 23f, 23g, 23h and 23i on side 14a and nine commutator segments 23j, 23k, 23l, 23m, 23n, 23o, 23p, 23q and 23r on side 14b of the insulating member. The number of commutator segments employed, as well as windings, is preferably equal to one and one-half times the number of field poles of the electric machine with which the armature is to be employed, as will be explained hereinafter.

In the present instance, the conductor arrays and commutator segments are connected together to provide three windings for the armature. In this arrangement, every third commutator segment is connected together to interconnect the conductor arrays to provide the three windings, for example, segments 23b, 23e and 23h are shown connected together, segments 23j, 23m and 23p are shown connected together and segments 23k, 23n and 23q are shown connected together. The other commutator segments are interconnected to one of the last-mentioned associated linked segements through apertures generally designated 24 through the insulating member. The appropriate windings are connected together through apertures in the insulating member, such as apertures 25, to provide the three windings of the armature, and the conductors of the arrays are shown connected to the appropriate commutator segments in a conventional manner.

Any other conventional winding pattern may be employed on the conical-shaped insulating member, such as, a three winding pattern in which the conductors are spiral in form and are equally spaced from one another and are connected together in series. In this arrangement, three spiral-shaped conductors would be provided on each side of the insulating member and connected together in a conventional manner to provide three windings for the armature.

It should be understood that, when the armature is employed in A.C. induction motors or the like, commutator segments and brushes to be used therewith would not be required.

The conical-shaped arrangement of the insulating member of the armature provides a rigid support structure for the winding patterns and provides a strong structure to prevent warping caused by heating of the conductive pattern on the insulating member in an electric machine. In addition, the conical shape of the insulating member permits more conductors in a winding pattern to be placed on the surface of the insulating member, resulting in a more powerful electric machine for a given diameter of its housing.

Referring now to FIG. 3, there is shown by way of illustration a D.C. motor generally designated 26 employing the armature in accordance with the present invention, as shown in FIG. 1. The motor comprises a housing 27 having sidewalls 27a and integral end 27b of cast metal. The sidewalls 27a are frustoconical in form and extend outwardly from end 27b. An end plate 28 is secured, as by screws, to the base of the frustoconical sidewalls of housing 27 to close the housing. The rotor employed in the D.C. motor of FIG. 3 is the same as the rotor shown in FIG. 1, and the same parts in FIG. 3 are identified by the same number designators. The shaft 20 of the rotor is journalled in end 27b of the housing and end plate 28 as by bearings 32 and 34, respectively, and is held in position in the housing by snap rings 36 and 38 positioned in grooves in the shaft at opposite ends of the housing adjacent bearings 32 and 34, respectively.

The housing 27 is preferably of a frustoconical shape to conform to the shape of the armature 10 for conveniently supporting the means for providing magnetic flux paths across the armature. However, the housing may be of any shape to accommodate the armature. The means for producing a magnetic field is provided, in this instance, by an even number of preferably congruous arcuate-shaped permanent magnets generally designated 52 mounted on and conforming to inner conical surface of sidewalls 27a of housing 27. In the embodiment of FIG. 6, six face-polarized magnets are employed symmetrically positioned on the housing and arranged such that each adjacent faced-polarized magnet is of opposite polarity with respect to the next adjacent magnet. There is illustrated in FIG. 2 the representative shapes and positioning of the six magnets designated 52 around the armature providing six field poles. As previously stated, the number of conductive segments preferably employed in the motor, as well as the number of conductor arrays on each side of the armature, is equal to one and one-half times the number of field poles. Therefore, in the present D.C. motor employing six field poles, the armature has nine conductor arrays and nine commutator segments, as described in regard to FIG. 2a.

A frustoconical annular member 60 of magnetic material is provided under the armature 10 to complete the magnetic circuit on the other side of the armature, as shown in FIG. 3. The annular member 60 is mounted to end plate 28 as by screws and provides a stator field flux return path for the magnetic flux generated by the magnets 52. As can be seen, flux return member 60 is of a shape to conform to the conical shape of the armature to minimize the air gap from the magnets across the armature. It should be noted that the field flux return member could be supported by the armature in certain embodiments of the electric machine with the field flux return member being insulated from the winding pattern as by a thin Mylar film, for example. The armature, however, is preferably thin without the field flux return member on the armature so that the armature may be light in weight to have low inertia for rapid starting and stopping.

End 27b of housing 27 supports brush holders 62 and 64, which support spring biased brushes 66 and 68, respectively, extending through end 27b and adapted to contact and ride over appropriate commutator segments of the conductive pattern. The brushes may be formed of a conventional material such as carbon or a sintered copper-lead-graphite mixture, the brushes being beveled at their outer ends to provide good contact with the commutator segments. One position of the brushes on the commutator segments is schematically illustrated in FIG. 2a.

The motor shown and described in FIG. 3 operates in a conventional manner with a direct current being supplied from a suitable source through electrical leads 70 and 72 to brushes 66 and 68, respectively. The armature comprising the insulating member 12 and winding pattern 14 is preferably kept thin and is adapted to rotate closely adjacent the magnets 52 on one side and flux return member 60 on the other to prevent losses due to large air gaps in the magnetic system. The flux path across the armature would be from the north pole of one of the magnets through the sidewall 27a of the housing into the south pole of the next adjacent magnet and from the north pole of the last-mentioned magnet through armature 10 to flux return member 60 back across the armature to the south pole of one of the adjacent magnets and so forth around the armature.

Since the armature in the motor of FIG. 3 is conical in shape and the associated magnetic structure is conical in shape to conform to the shape of the armature, a convenient space is provided between the frustoconical flux return member 60 and end plate 28 for reduction gears or other desired structure which are required with motors. Such gearing can be conveniently placed under the armature in the housing of the motor without increasing the axial length of the housing and enables the gearing to be within the housing so as not to be effected by water, dust or dirt, which may be environmental elements in the area of use of the motor.

Figure 4:
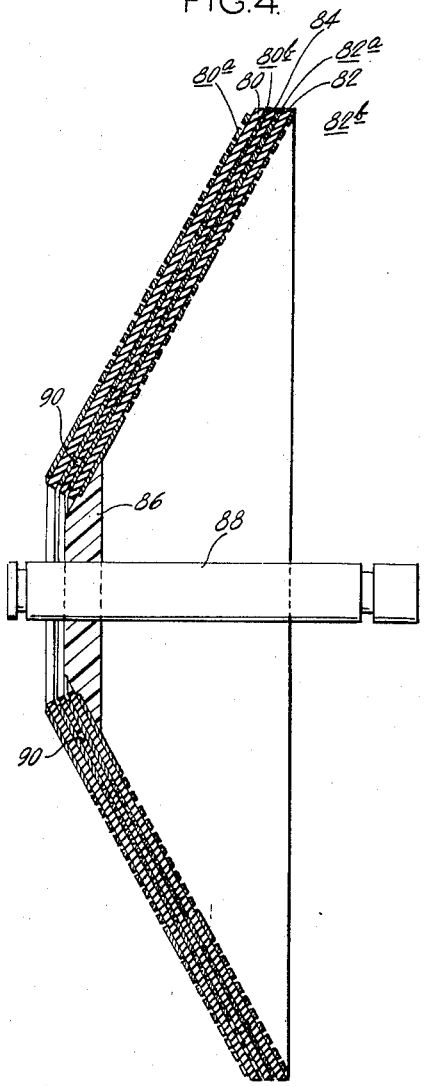
FIG. 4 is a schematic sectional view of a stacked arrangement of a conical shaped armature assembly.

FIG. 4 shows an arrangement of a stacked or sandwiched assembly of conical-shaped armatures for providing the rotor on electric machines requiring a greater power output than can be obtained from a single armature having winding paterns on opposite faces. The stacked armature assembly of FIG. 4 comprises insulating members 80 and 82 separated by an insulating member 84, which may be provided by a thin Mylar film. The insulating members 80 and 82 are each provided with winding patterns 80a and 80b and 82a and 82b, respectively, on opposite faces of each member, which may be printed, plated, etched, pressure bonded or otherwise fixed thereon in a conventional manner.

The insulating members are preferably frustoconical in form in accordance with the invention and have their central top portions omitted to receive a shaft. The insulating members may be attached together as a unit, as by an epoxy cement. An annular support member 86 is fixed to the stacked assembly, as by epoxy cement, at the central opening, as shown in FIG. 4. The support member may be made of a molded plastic material having a central opening through which a shaft 88 may be inserted for rotation therewith. The insulating members are all frustoconical conforming to the shape of one another and may extend outwardly from the shaft at an angle within the range of zero and ninety degrees from the axis of the shaft, in this instance the angle is sixty degrees. The conductive patterns 80b and 82a on the insulating members 80 and 82, respectively, are electrically connected together at appropriate points on the patterns in a conventional manner by electrical connections through apertures designated 90 in insulating member 84, as shown schematically in FIG. 4. It should be appreciated that more than two insulating members having conductive patterns thereon could be provided in a stacked armature arrangement as required for a desired application of the armature.

It should be apparent to those skilled in the art that the conical-shaped armature in accordance with the present invention provides many advantages over the disc armatures employed in the prior art. In accordance with the present invention, the armature being generally conical in shape is more rugged than the disc armatures to prevent warping of the armature and avoid having the armature strike the stator field pieces. Furthermore, the present conical-shaped armature provides a greater area for more effective conductors to be placed in the magnet field paths for a given diameter of the machine housing, resulting in a more powerful machine. In addition, by employing the generally conical-shaped armature and associated magnetic field structure, a convenient space in the housing is provided within the conical configuration for reduction gears, for example, which are often required on electrical machines.

I claim:

1. An armature for an electric machine, comprising: a thin insulating member formed to provide a conical surface and diverging from a plane normal to its major axis of rotation at a substantial angle between zero and ninety degrees, and a conductive pattern supported on the conical surface of the insulating member providing one or more windings for the electric machine and including a plurality of conductors located between the center and circumference of the insulating member.

2. An armature for an electric machine, comprising: a thin insulating member formed to provide a conical surface and diverging from a plane normal to its major axis of rotation at a substantial angle between zero and ninety degrees, the insulating member having an opening at the axis of rotation adapted to receive a shaft; and a conductive pattern supported on the conical surface of the insulating member providing one or more windings for the electric machine and including a plurality of conductors located between the center and circumference of the insulating member.

3. The armature of claim 2 in which the conductive pattern is supported on the conical surface of the insulating member on one side thereof, the armature further including a second conductive pattern supported on the conical surface of the insulating member on the other side thereof and including a plurality of conductors located between the center and circumference of the insulating member, the insulating member having apertures to permit interconnection of the conductive pattern, and means connecting the conductors of the patterns through the apertures of the insulating member.

4. The armature of claim 2 further comprising commutator means supported on the conical surface of the insulating member and formed at the ends of at least some of the conductors.

5. The armature of claim 4 in which the conductors are mutually insulated and the commutator means is provided with a number of commutator segments equal to one and one-half times the number of field poles with which the armature is to be employed.

6. The armature of claim 2 in which the conductors of the conductive pattern provide at least three windings for the electric machine.

7. The armature of claim 6 in which the conductors are arranged in at least nine arrays connected together to provide the three windings.

8. The armature of claim 6 in which the conductors forming the three windings are spiral in form and are equally spaced from one another and are connected together in series.

9. An armature for an electric machine, comprising: a first thin insulating member formed to provide a conical surface and diverging from a plane normal to its major axis of rotation at a substantial angle between zero and ninety degrees; a first conductive pattern supported on the conical surface of the first insulating member providing one or more windings for the electric machine and including a plurality of conductors located between the center and circumference of the first insulating member; a second thin insulating member formed to provide a conical surface and conforming to the shape of the first insulating member; a second conductive pattern supported on the conical surface of the second insulating member providing one or more windings for the electric machine and including a plurality of conductors located between the center and circumference of the second insulating member; and means connecting at least some of the conductors of said first pattern with different ones of the conductors of the second pattern.

10. The armature of claim 9 further comprising a third thin insulating member formed to provide a conical surface and conforming to the shapes of first and second insulating members, the third insulating member being located between and adjacent to the first and second insulating members to insulate the first and second conductive patterns from one another and having apertures to permit the means connecting the conductors of the first and second patterns to pass therethrough.

11. An electric machine having a rotor including a shaft and a stator supporting the shaft, comprising: a thin insulating member adapted to rotate with the shaft and formed to provide a conical surface, the insulating member diverging outwardly around the shaft at a substantial angle between zero and ninety degrees to the axis of the shaft; a conductive pattern supported on the conical surface of the insulating member providing one or more windings for the electric machine and including a plurality of conductors located between the center and circumference of the insulating member; and magnetic means supported by the stator and generally conforming to the shape of the insulating member for providing magnetic flux paths of alternate polarity across the insulating member through the conductors.

12. The electric machine of claim 11 further comprising at least a second thin insulating member formed to provide a conical surface and conforming to the shape of the first-mentioned insulating member, the second insulating member being adapted to rotate with the shaft; a second conductive pattern supported on the conical surface of the second insulating member providing one or more windings for the electric machine and including a plurality of conductors located between the center and circumference of the second insulating member; and means connecting at least some of the conductors of the first-mentioned conductive pattern with different ones of the conductors of the second conductive pattern.

13. The electric machine of claim 11 in which the magnetic means comprises flux generating means providing an even number of field poles, each field pole being of alternately opposite polarity around the insulating member, and means providing a low-reluctance magnetic circuit completed through the conductive pattern on the insulating member.

14. The electric machine of claim 11 in which the magnetic means comprises flux generating means providing an even number of field poles and conforming to the shape of the insulating member on one side thereof, each field pole being of alternately opposite polarity, and means providing a low-reluctance magnetic circuit conforming to the shape of the insulating member on the other side thereof from the flux generating means, the magnetic circuit being completed through the conductive pattern on the insulating member.

15. A D.C. electric machine having a rotor including a shaft and a stator supporting the shaft, comprising: a thin insulating member adapted to rotate with the shaft and formed to provide a conical surface, the insulating member diverging outwardly around the shaft at a substantial angle between zero and ninety degrees to the axis of the shaft; a conductive pattern supported on the conical surface of the insulating member providing one or more windings for the electric machine and including a plurality of conductors located between the center and circumference of the insulating member; magnetic means supported by the stator and generally conforming to the shape of the insulating member for providing magnetic flux paths of alternate polarity across the insulating member through the conductors; commutator means supported on the conical surface of the insulating member and formed at the ends of at least some of the conductors; and at least two electrical brushes supported by the stator and angled to contact the commutator means.

16. The D.C. electric machine of claim 15 in which the conductive pattern is supported on the conical surface of the insulating member on one side thereof, the armature further including a second conductive pattern supported on the conical surface of the insulating member on the other side thereof and including a plurality of conductors located between the center and circumference of the insulating member, the insulating member having apertures to permit interconnection of the conductive patterns, and means connecting the conductors of the patterns through the apertures of the insulating member.

17. The D.C. electric machine of claim 15 in which the magnetic means comprises flux generating means providing an even number of field poles, each field pole being of alternately opposite polarity around the insulating member, and means providing a low-reluctance magnetic circuit completed through the conductive pattern of the insulating member.

18. The D.C. electric machine of claim 17 in which the conductors are mutually insulated and the commutator means is provided with a number of commutator segments equal to one and one-half the number of field poles.

19. The D.C. electric machine of claim 15 in which the conductors of the conductive pattern provide at least three windings for the electric machine.

20. The D.C. electric machine of claim 19 in which the conductors are arranged in at least nine arrays connected together to provide the three windings.

21. The D.C. electric machine of claim 19 in which the conductors forming the three windings are spiral in form and are equally spaced from one another and are connected together in series.

22. The D.C. electric machine of claim 15 further comprising at least a second thin insulating member formed to provide a conical surface and conforming to the shape of the first-mentioned insulating member, the second insulating member being adapted to rotate with the shaft; a second conductive pattern supported on the conical surface of the second insulating member providing one or more windings for the electric machine and including a plurality of conductors located between the center and circumference of the second insulating member; and means connecting at least some of the conductors of the first-mentioned conductive pattern with different ones of the conductors of the second conductive pattern.

References Cited

UNITED STATES PATENTS

| | | | |
|---|---|---|---|
| 2,721,284 | 10/1955 | Elmer | 310—266 |
| 3,296,474 | 1/1967 | Henry-Baudot | 310—268 |
| 3,308,322 | 3/1967 | Hahn | 310—268 |

WARREN E. RAY, Primary examiner

LAWRENCE A. ROUSE, Assistant Examiner

U.S. Cl. X.R.

310—266, 268